July 12, 1949.     R. J. TEETSELL     2,475,649

RADIO CIRCUIT TESTING SYSTEM

Filed Feb. 19, 1945

*INVENTOR.*
ROY J. TEETSELL

BY
*William D. Hall*
ATTORNEY

Patented July 12, 1949

2,475,649

UNITED STATES PATENT OFFICE 2,475,649

RADIO CIRCUIT TESTING SYSTEM

Roy J. Teetsell, Long Branch, N. J.

Application February 19, 1945, Serial No. 578,752

4 Claims. (Cl. 250—20)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to improvements in radio circuit testing systems.

Heretofore, in the determination of proper operating conditions in electrical equipment, such as the measurement of voltage values in radio receivers and transmitters, television apparatus and other electron-operated devices, it has been necessary to partially dismantle such equipment in order to make these measurements.

With the foregoing in mind, it is one of the objects of my invention to provide a radio circuit testing system wherein it is possible to effect a rapid alignment of various radio equipment without the necessity of disconnecting or dismantling any part thereof, and to do this with a minimum number of meters.

Other objects and advantages will hereinafter appear.

Figure 1:
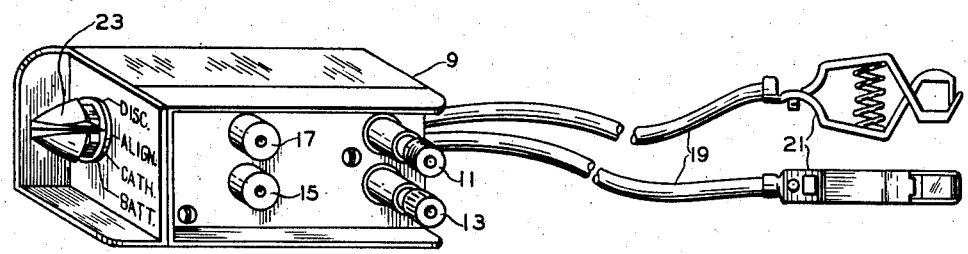
Figure 2:
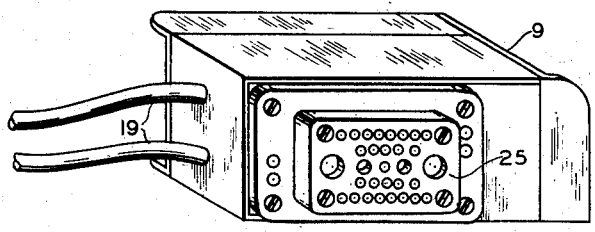
Figure 3:
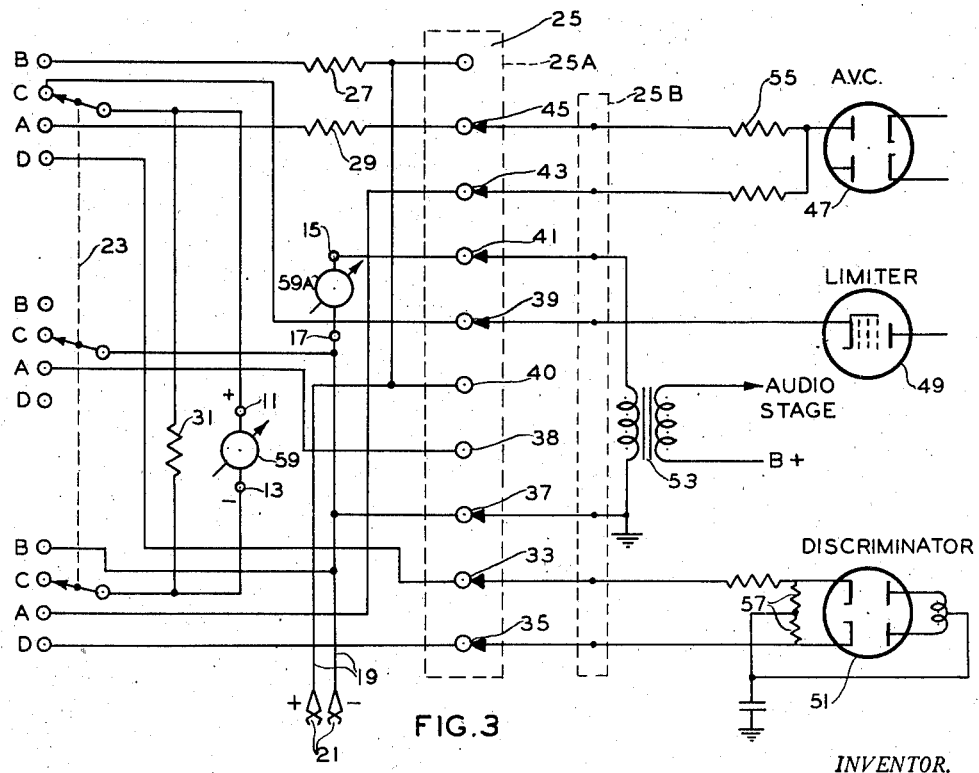

For the purpose of illustrating my invention, an embodiment thereof is shown in the drawing, wherein Figure 1 is a perspective of a unit forming part of my improved system;

Figure 2 is a perspective, showing the other side of the unit shown in Figure 1; and Figure 3 is a simplified, diagrammatic view of my improved system, showing the manner in which the respective units or parts are connected to a typical radio receiver for testing purposes.

Referring more particularly to Figure 1, a case 9 has affixed to the outside thereof a pair of binding posts 11 and 13. Two pin-type jacks 15 and 17 are also affixed to the same side in parallel relation to the binding posts 11 and 13. Extending from the end of case 9 is a pair of heavy duty battery cables 19 terminating in a pair of battery clips 21. Attached to the end opposite that from which the battery cables 19 extend is a selector switch 23.

Figure 2 illustrates that side of case 9 opposite the side to which is affixed the pin jacks 15, 17 and binding posts 11, 13. To the aforementioned side is mounted a female multi-contact connector 25.

Figure 3 is a schematic of the electrical components which are enclosed in the case 9. Resistances 27, 29 and 31 function as a voltage dividing network, reducing the voltage applied to the measuring device. The space encompassed by the broken lines 25A represents a portion of the female connector 25 with terminals 33, 35, 37, 38, 39, 40, 41, 43, and 45. The broken lines 25B designate the male connector which is attached to the radio receiver and thence to the radio receiver stages.

Electron discharge valves 47, 49 and 51 represent several stages in a radio circuit as designated. The transformer 53 shown represents the audio output stage of the aforementioned radio receiver. The aforementioned stages are permanently connected to the male connector permanently installed in the receiver.

Generally, the adapter part of my invention is intended for operation in connection with direct current electronic voltmeters, known also as vacuum tube voltmeters (V. T. V. M.). These measuring devices, designated in Fig. 3 as 59 and 59A are of the high resistance type, well known to those acquainted with the art of making electronic measurements. However, my invention is not limited to direct current measurements, but is equally usable for alternating current measurements as well.

In this particular embodiment of my invention the adapter functions to connect a measuring device of the type heretofore described to various parts of a receiver circuit, having the connector 25B heretofore mentioned, to facilitate alignment procedure. The purpose of my invention in this particular embodiment, is to simplify the alignment of such stages as radio frequency (R. F.), intermediate frequency (I. F.), oscillator, and in the case of frequency modulation (F. M.) receivers, the discriminator stage. My invention makes possible measurements of operating conditions in the aforementioned stages without upsetting the functions of such stages and without the necessity of disconnecting or re-attaching test leads during each alignment step.

Through the use of selector switch 23 which is marked Disc., Align., Cath., and Batt., the I. F. amplifier, beat frequency oscillator, discriminator, and R. F. stages of a receiver may be aligned with comparative ease and accuracy.

In the Disc., Figure 1 or discriminator position D, Figure 3, the invention automatically connects the measuring device 59 used across the receiver discriminator load resistors 57 thru connector 25 being connected to a male connector (not shown) which is a part of the receiver under observation.

The reading obtained on the measuring device 59 connected across the binding posts 11 and 13 of the invention, will therefore be an indication of the discriminator output voltage.

When the selector switch 23 of my invention is rotated to the Align. position Figure 1 or A, Figure 3, the measuring device 59 connected to binding posts 11, 13 is connected thru a high resistance 29 to terminals 43, 45 of the connector 25. The measuring device is therefore connected to measure the voltage across resistor 55 thus measuring the magnitude of the automatic volume control (A. V. C.) voltage developed as a result of tuning the primary of the receiver discriminator transformer (not shown) in the case of a F. M. receiver.

With selector switch in the Align. position or A, Figure 3, the cathode of the electronic discharge valve 47 in the A. V. C. stage is at ground potential via the connection 60 and terminal 38. Delayed A. V. C. action is thereby eliminated, to allow for peaking of the aforementioned discriminator transformer (not shown).

With the selector switch 23 in the Cath. or C position, binding post 11 of the voltmeter 59 is connected, through terminal 39 of connector 25, to the cathode of valve 49. The other binding post 13 is connected to ground, as shown, through the contacts C and B of switch 23, and the terminal 37. An indication is thus obtained of the voltage above ground of the cathode of valve 49, which in this particular illustration is the limiter tube. This indication or reading is used when aligning the I. F. and R. F. stages in a radio receiver.

In the Batt. position of selector switch 23 or B, Figure 3, the use of the invention places the measuring device 59 in series with a voltage reducing resistor 27. By these means the battery voltage, in the case of battery-operated receivers, may be checked without the necessity of removing the unit. The resistor 27 permits a reading on the measuring device on its low range scale.

Means for determining the output strength of the equipment under observation, as indicated in this particular embodiment, are provided by my invention through the medium of two pin jacks into which may be inserted a measuring device 59A. As illustrated in Figure 3, connections to the invention, in this particular application are made to the pin jacks 15 and 17 through terminals 37 and 41 of connector 25, said terminals making connection with the output stage of the equipment under observation, said stage being represented by transformer 53, the primary of said transformer 53 being connected to the electron discharge valve in the audio stage and positive side of the power supply.

The novel and cooperative arrangement of circuit parameters and components of my invention, in addition to providing rapid and semi-precision alignment measurements of equipment under observation also enables the operator to safely make extremely high potential current measurements without the necessity of exposing himself or his measuring equipment to said high potentials.

While what has been described herein is the preferred embodiment of my invention other arrangements are possible and obvious to those conversed in the art, and it is, therefore, aimed to cover all such changes and modifications as fall within the true spirit and scope of my invention.

What is claimed is:

1. In a circuit testing system for a frequency modulation receiver structure including limiter, discriminator, and audio-frequency stages, and a housing containing said stages, each of said stages having a plurality of pairs of points having a potential difference therebetween and normally inaccessible externally of said housing; a circuit testing device to selectively measure the value of voltages appearing across each of said pairs of points, said device including a multi-terminal connector having two separable sections, one section being affixed to said structure and having the terminals thereof permanently affixed to said pairs of points, said terminals being available from the outside of said housing, a second section having terminals detachably connectible to the terminals of said first section, said second section having terminals for connection to a voltage measuring instrument, and a circuit including a plurality of voltage dropping resistance elements and a multiple position switch for selectively connecting said instrument to each of said pairs of points through selected resistance elements to selectively measure the potential difference across each of said pairs of points.

2. The combination set forth in claim 1, wherein said switch has four switching positions, a first position connecting said instrument through a first resistor across a pair of said points of potential difference in said discriminator stage, a second position connecting said instrument through a second resistor across a pair of said points of potential difference in said limiter stage, a third position connecting said measuring instrument across a pair of said points of potential difference in said audio stage, said second section having a pair of terminals thereon for connection to an external power supply for said receiver structure, and a fourth switching position connecting said measuring instrument across said power supply through a third resistor.

3. In a radio circuit testing system for a radio circuit structure having several stages therein which are normally inaccessible externally thereof and which it is desired to make readily available for testing externally of said structure without disturbing any portion thereof; a circuit-testing device adapted to be detachably connected to said structure, said circuit-testing device comprising a multiple-terminal connector having two separable sections, one section being permanently affixed to said structure and having the terminals thereof permanently connected to said stages and disposed to be accessible at the exterior of said structure, said circuit-testing device including as a part thereof the other section of said connector, a measuring instrument, and a selector switch interposed between the terminals of said other section and said measuring instrument to selectively connect said stages to said measuring instrument.

4. In a radio circuit testing system for a radio receiver structure including limiter, discriminator and audio-frequency stages each normally inaccessible externally thereof; a voltmeter, and means to enable use of said voltmeter to selectively measure the output of said stages externally of said structure, said means comprising a multi-terminal connector having two separable sections, one section being affixed to said structure and having the terminals thereof permanently connected to said stages and available externally of said structure, and an adapter having as an integral part thereof the other section of said separable connector, said adapter comprising terminals for connection to said voltmeter, a voltage-dividing network for said voltmeter; and a multi-section, multi-contact switch interconnecting the terminals of said other section and said voltage divider and said voltmeter terminals for selectively connecting any of said stages to said voltmeter and to the proper point on said voltage divider to adapt said voltmeter to the voltage range of the stage selected for testing.

ROY J. TEETSELL.

REFERENCES CITED

The following references are of record in the file of this patent:

UNITED STATES PATENTS

| Number | Name | Date |
|---|---|---|
| 1,686,451 | Hill | Oct. 2, 1928 |
| 2,007,992 | Wenger | July 16, 1935 |
| 2,023,947 | Auble | Dec. 10, 1935 |
| 2,117,582 | Stull | May 17, 1938 |
| 2,165,064 | Mackay | July 4, 1939 |
| 2,227,381 | Rider | Dec. 31, 1940 |